Feb. 20, 1945.                C. S. BROWN                    2,369,942
                      THREADLESS CONDUIT COUPLING
                         Filed March 20, 1944
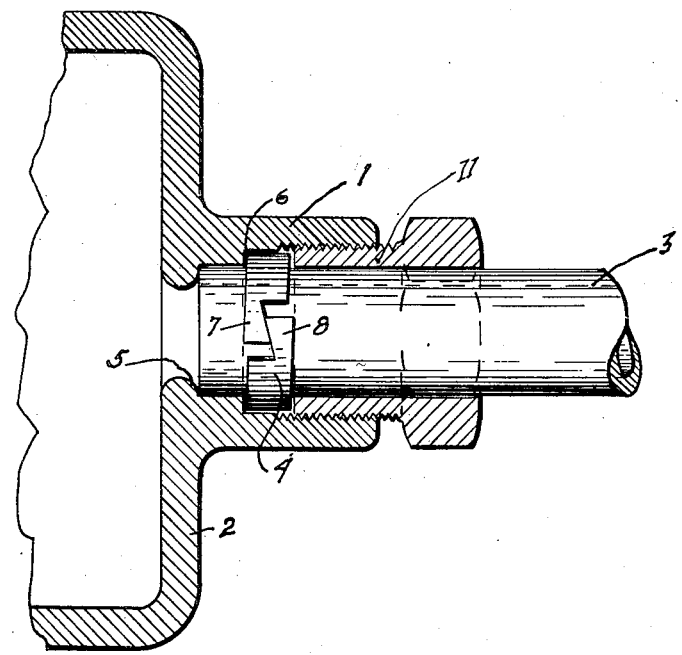
Fig-1-
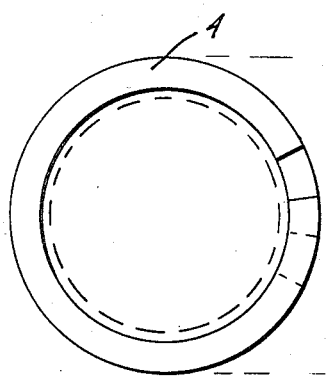   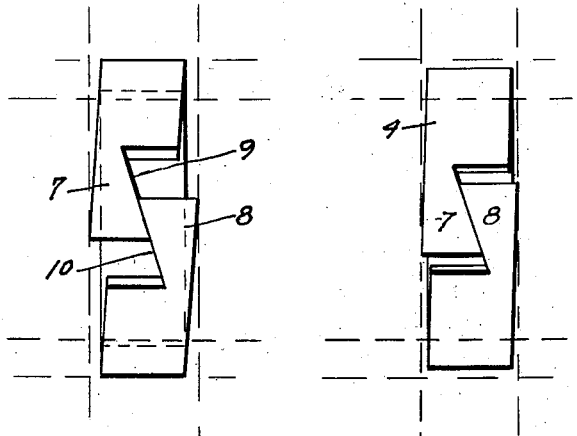
Fig-2-       Fig-3-      Fig-4-
INVENTOR.
Charles S. Brown
BY
Bodell & Thompson
ATTORNEYS.

Patented Feb. 20, 1945

2,369,942

UNITED STATES PATENT OFFICE 2,369,942

THREADLESS CONDUIT COUPLING

Charles S. Brown, Kirkville, N. Y.

Application March 20, 1944, Serial No. 527,262

2 Claims. (Cl. 285—166)

This invention relates to pipe or conduit coupling of the type for coupling a pipe or conduit to an object, as a conduit outlet box, or to another conduit and including a clamping ring which contracts on the conduit providing a threadless connection with the conduit. The coupling is particularly adapted for electrical conduits.

The invention has for its object a contractile ring split transversely and having the ends overlapping in edgewise relation, that is, formed with tongues at the ends of the ring at the split, which lap within the thickness of the ring, the tongues having coacting inclined plane cam surfaces which coact when the clamping force is applied to the sleeve in an axial direction, causing the ring to contract upon the conduit, which is plain or unthreaded.

This coupling is shown as connecting an unthreaded conduit, as an electrical conduit, to an outlet or junction box, although it may be used to couple two conduits or pipes together.

The invention consists in the novel features and in the combinations and constructions hereinafter set forth and claimed.

In describing this invention, reference is had to the accompanying drawing in which like characters designate corresponding parts in all the views.

Figure 1 is a fragmentary sectional view of a conduit outlet box or pipe with the coupling applied thereto.

Figure 2 is an enlarged edge view of the clamping ring.

Figures 3 and 4 are edge elevations of the clamping ring showing the positions occupied by the cam ends of the ring at the split thereof at the beginning of the contracting operation and at the end of the contracting operation respectively.

1 designates the body of the coupling, this being the boss on the outlet box 2. It may be a sleeve when coupling two conduits together. 3 designates a conduit or pipe, and 4 the clamping ring. The conduit extends into the bore of the body or sleeve and through the ring and is limited in its movement by an internal shoulder 5 at the inner end of the body 1. The body or sleeve 1 is also formed with an internal annular shoulder 6 facing the outer end of the sleeve and this shoulder is of larger diameter than the conduit 3 and hence provides an annular shoulder within the body 1 around the conduit 3.

The ring 4 is a cylindrical band, is split transversely and provided with portions of less width in an axial direction than the band. The combined width of said portions being the same as the width of the ring, when the ring is fully contracted and being of slightly greater width than that of the ring, when normal or expanded (see Figures 3 and 4). These portions provide complemental tongues 7 and 8 which lap each other edgewise, the tongues being provided with complemental cam or inclined plane surfaces 9 and 10, respectively, at their lapping edges. These cam surfaces cause the ring to contract snugly on the conduit 3, when pressure is applied to the ring in an axial direction, forcing the ring snugly against the internal shoulder 6.

The axial force may be applied in any well known manner. It is here shown as applied by a sleeve nut 11 provided with a smooth bore through which the conduit 3 extends, the sleeve nut 11 threading into the bore of the body 1 and at its inner end thrusting against the ring 4. When the sleeve nut 11 is tightened, it causes the tongues 7 and 8 to act inclined plane fashion and ride up each other from the position shown in Figure 3 to that shown in Figure 4, thus contracting the ring 4, as the sleeve nut 11 compresses the ring between the inner end of the sleeve nut and the shoulder 6. Initially or while the ring is loose, it is in the position shown in Figure 3, that is, the ends or tongues at the split extend laterally into a position where the combined width thereof is slightly greater than that of the width of the ring 4 in an axial direction. As the nut 11 is tightened and the ring 4 compressed between the nut 11 and the internal shoulder 6, as shown in Figure 4, the tongues 7, 8 are caused to ride on the cam surface 9, 10 causing the ring 4 to contract tightly on the conduit 3 and hence firmly secure the conduit 3 in the body 1.

Although the body 1 is shown as a nipple or boss on an outlet box, obviously, it may be formed double, as a conduit or pipe coupling, for receiving a conduit in both ends thereof, both conduits being clamped in position by means of its individual ring 4 and sleeve nut 11.

What I claim is:

1. A conduit coupling comprising a body having a bore for receiving the conduit and an internal annular shoulder in the bore of greater diameter than the conduit, a contractile clamping ring for encircling the conduit and thrusting against the shoulder, the ring being split transversely and being provided with tongues at its ends at the split of the ring of less width than the ring, the tongues located in the arc of the ring overlapping and having opposing edge cam surfaces engaging inclined plane fashion, the combined width of the tongues being substantially that of the width of the ring in an axial direction when the ring is contracted, and a sleeve nut encircling the conduit, threading into said bore, and thrusting against the ring, whereby upon tightening of the ring against the shoulder, said tongues act inclined plane fashion and contract the ring on the conduit.

2. A conduit coupling comprising a body having a bore for receiving the conduit and an internal annular shoulder in the bore of greater diameter than the conduit, a contractile clamping ring for encircling the conduit and thrusting against the shoulder, the ring being a cylindrical band split transversely and provided with complemental tongues at its ends at the split located within the arc of the ring, the combined width of the tongues being substantially that of the ring in an axial direction when the ring is contracted, the tongues lapping each other and having coacting inclined plane cam surfaces at their lapping edges, and a sleeve nut encircling the conduit and threading into the bore against the ring for clamping the ring between the end of the sleeve nut and said shoulder, thereby causing said cam surfaces to act on each other and contract the ring on the conduit.

CHARLES S. BROWN.

CERTIFICATE OF CORRECTION.

Patent No. 2,369,942. February 20, 1945.

CHARLES S. BROWN.

It is hereby certified that error appears in the printed specification of the above numbered patent requiring correction as follows: Page 2, first column, line 14, for "conduit" read --bore--; and that the said Letters Patent should be read with this correction therein that the same may conform to the record of the case in the Patent Office.

Signed and sealed this 5th day of June, A. D. 1945.

Leslie Frazer (Seal) Acting Commissioner of Patents.